Figure 1:
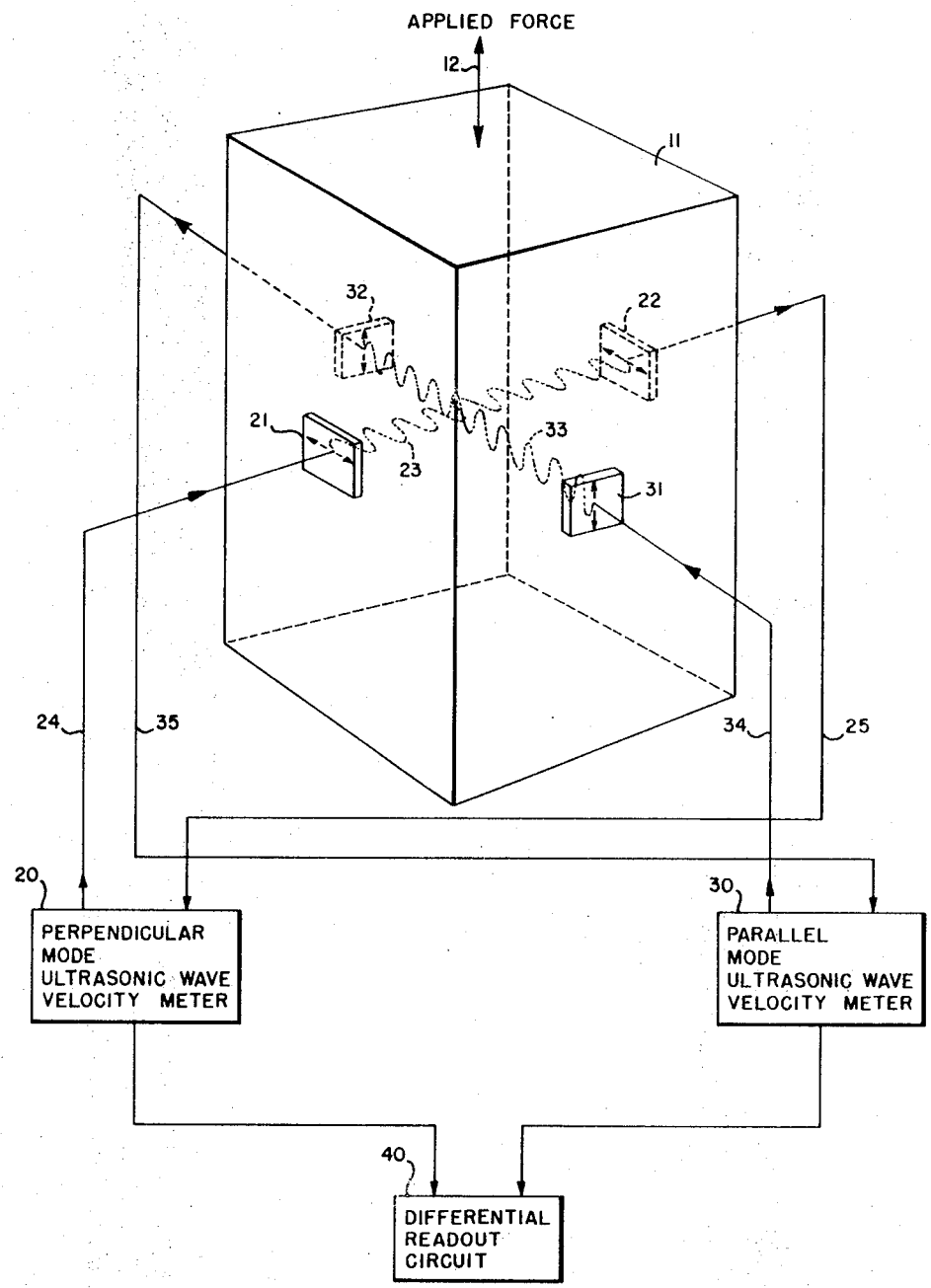

United States Patent

[11] 3,587,297

[72] Inventor Erwin W. Kammer
  McLean, Va.
[21] Appl. No. 762,471
[22] Filed Sept. 25, 1968
[45] Patented June 28, 1971
[73] Assignee The United States of America, as
  Represented by the Secretary of the Navy

[54] APPARATUS FOR PRECISE STRESS MEASUREMENT
  1 Claim, 2 Drawing Figs.
[52] U.S. Cl. .................................................... 73/67.6,
  73/88
[51] Int. Cl. .................................................... G01n 24/00
[50] Field of Search ..................................... 73/67,
  67.1—.3, 67.5, 67.6, 88.5, 133 (B), 133 (D), 139

[56] References Cited
  UNITED STATES PATENTS
  2,993,373 7/1961 Kritz .............................. 73/67.5X
  3,209,591 10/1965 Lester et al. ................... 73/67.5X OTHER REFERENCES
Smith, R.T., " Stress Induced Anisotropy In Solids: The Acousto-Elastic Effect," Ultrasonics, July— Sept., 1963, p. 139— 144

Primary Examiner—Richard C. Queisser
Assistant Examiner—Arthur E. Korkosz
Attorneys—R. S. Sciascia and A. L. Branning ABSTRACT: Apparatus for precise stress measurement which includes the simultaneous transmission of two ultrasonic waves into an isotropic polycrystalline medium in a direction normal to the direction of the stress field applied thereto. One of the waves is polarized parallel to the direction of the stress field so that increasing stresses cause a decrease in the ultrasonic wave velocity within the medium, and the other is polarized perpendicular to the stress field so that increasing stresses cause an increase in the ultrasonic wave velocity within the medium. The wave velocities of the two signals are differentially compared to thereby provide precise measurement of the applied stress independent of temperature variations.

INVENTOR
ERWIN W. KAMMER

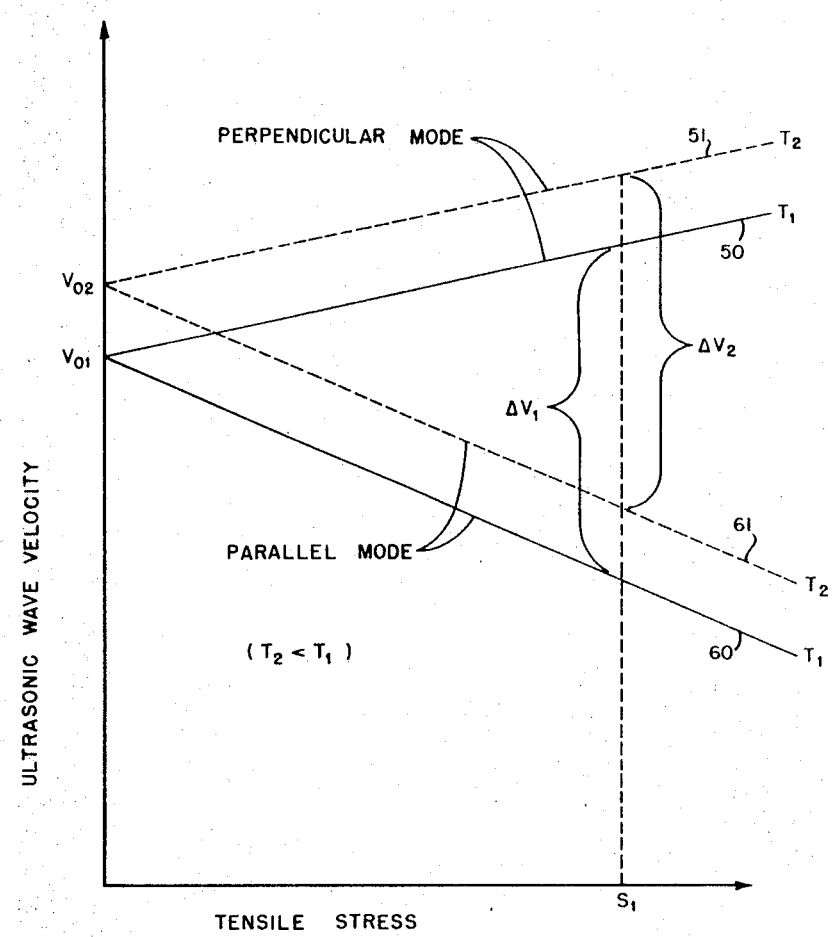

APPARATUS FOR PRECISE STRESS MEASUREMENT

The invention described herein may be manufactured and used by or for the Government of the United States of America for governmental purposes without the payment of any royalties thereon or therefor.

This invention relates to a novel related apparatus for determining stress conditions in solid bodies, and more particularly relates to a temperature insensitive stress gauge useful for measuring pressure.

It has been the general practice to employ stress gauges which measure the quantitative conditions in solid bodies to provide an indication of the surrounding pressure. Although such devices have served the purpose, they have not proved entirely satisfactory under all conditions of service for the reason that considerable difficulty has been experienced in providing such devices with adequate temperature compensation. One device which is typical of the prior art, is shown and described in an article by Peter L. M. Heydemann entitled "An Ultrasonic Pressure Gauge," ASME paper 66-WA/PT-5, 1966. As discussed in the article, the velocity of an ultrasonic wave travelling through a solid is determined by the density and elastic constants of that solid for a given mode of vibration. Although nominal stresses applied to the medium cause negligible changes in the density, the change in the elastic constants is readily observable and is subject to precise measurement. By utilizing this phenomenon, precise measurements of pressure can be made. Prior art ultrasonic stress gauges, however, suffer from the disadvantage that variations in the temperature of the solid medium used cause corresponding variations in the velocity of the ultrasonic wave travelling through the solid. Complex schemes have been developed in the prior art to compensate for these variations, however, they are expensive and extremely critical.

In distinction to the teachings of the prior art, the present invention is directed to a related apparatus for stress analysis which removes the adverse effects of temperature variation from the ultimate stress output measurement. The invention contemplates utilization of the fact that while the change in ultrasonic wave velocity through a solid medium is positive when the plane of vibration of the ultrasonic wave is normal or perpendicular to an applied stress field and is negative when the particle motion is parallel to the field, any variations in ultrasonic wave velocity caused by ambient temperature changes occur in the same direction for both polarization modes. By simultaneously transmitting two ultrasonic waves through a single solid body, one of which is polarized parallel to the stress field and the other of which is polarized normal to the stress field, and by subtracting the respective velocities of the two waves, a direct readout is obtained which is indicative of the applied stress within the solid body. Due to the fact that temperature is similarly related to the velocity of both parallelly and perpendicularly polarized ultrasonic signals, any temperature fluctuations of the solid medium will be cancelled by the step of subtracting and, therefore, will have no effect on the resultant output readings.

Accordingly, it is an object of the invention to provide a stress gauge which is insensitive to variations in temperature.

Another object is to provide a method for precise stress measurement independently of variations in temperature.

A further object of the invention is the provision of a stress gauge which has high resolution for small changes in applied stress.

Still another object is to provide a method and apparatus for measuring applied stresses which has extremely low hysteresis.

Still another object is to provide a method and apparatus useful in oceanographic devices to measure pressure independently of temperature.

A still further object of the invention is to provide an accurate pressure gauge which is easily mountable and is insensitive to vibration and shock.

It is a still further object of the invention to provide a method and apparatus for measuring stress wherein various solid materials, heretofore undesirable due to their adverse temperature variation characteristics may be used.

Other objects and many of the attendant advantages of this invention will become more fully apparent by reference to the following detailed description when considered in connection with the accompanying drawings in which like reference numerals designate like parts throughout the FIGS. thereof and wherein:

FIG. 1 is a block diagram illustrative of the principles of operation of the invention; and FIG. 2 is a graph showing the variation in ultrasonic signal wave velocity with tensile stress.

Referring more specifically to FIG. 1, there is shown a solid block 11 upon which the constraining force to be measured is applied. The direction of applied force is shown diagrammatically by line 12 to clarify the illustrated embodiment. The solid block 11 can be any isotropic polycrystalline material such as steel, aluminum, magnesium, titanium, and fused silica, to cite a few, depending upon the particular design characteristics desired. For example, certain applications may call for a nonferromagnetic material due to the presence of an external magnetic field which would cause unpredictable results if a material such as steel were used. The only property which must be exhibited by every material to be used, aside from its isotropic polycrystalline structure, is a measurable variation in the elastic constants of the solid as the stress applied thereto is varied.

Continuing with FIG. 1, four transducers 21, 22, 31, and 32 are coupled to the sides of the solid block 11 to thereby transmit two ultrasonic waves 23 and 33 through the block in a direction normal to the direction of applied stress. It is noted that although the transducer pairs 21—22 and 31—32 are illustrated as transmitting the two ultrasonic waves 23 and 33 through the solid block 11 at right angles to each other, this is not necessary as long as both waves are normal to the direction of applied stress. The transducers are cut in such a manner that their crystal lattice structures exhibit a preferred polarizing plane; i.e., maximum energy transfer or couple occurs when oscillatory motions exist in a preferred plane. Transducers 21 and 22 are oriented with their preferred polarizing planes parallelly aligned (as shown by the two-headed arrows) so as to transmit and receive, respectively, an ultrasonic signal 23 having its plane of vibration perpendicular to the direction of applied force 12. The ultrasonic signal is generated by the perpendicular mode ultrasonic wave velocity meter 20 and is applied to transmitting transducer 21 via line 24. The signal received by transducer 22 after travelling through solid block 11 is fed back to the velocity meter 20 via line 25 to complete the signal path loop so that the velocity of propagation of the wave can be measured. In like manner, velocity meter 30 generates an ultrasonic wave which is applied to transmitting transducer 31 via line 34. Transducer 31, in conjunction with parallelly aligned receiving transducer 32 sends the wave through the solid 11 with its plane of vibration parallel to the direction of applied force 12 whereupon it is received by transducer 32 and returned to the velocity meter 30 via line 35 to complete the parallel mode loop.

It is noted that the perpendicular mode velocity meter 20 and the parallel mode velocity meter 30 are identical, and any circuit which generates an ultrasonic signal and measures its velocity of propagation can be used. One well-known circuit, shown and described in the aforementioned article by Peter L. M. Heydemann, comprises a multivibrator signal generator which is triggered into operation by the receipt of a previously transmitted signal. The burst of signals generated by the multivibrator when triggered "on" is transmitted through the solid by the transducers and is used to trigger a subsequent signal burst of the multivibrator. Thus the frequency of repetition of the signal bursts is directly proportional to the transit time, and therefore the velocity of propagation, of the ultrasonic wave through the solid. This frequency can then be easily counted and displayed by any well-known techniques. This method is known as the pulse sing-around method and has been found to be highly accurate. Another well-known technique involves the generation of ultrasonic waves which are adjusted in frequency until a standing wave is setup across the solid. The ultrasonic generator is frequency locked by a closed loop such that the standing wave will be maintained within the solid as the stress varies. Thus, the ultrasonic signal frequency provides a direct indication of transit time, and therefore velocity of propagation, of the ultrasonic wave.

Referring again to FIG. 1, the outputs from velocity meters 20 and 30 are connected to suitable readout circuitry 40 which subtracts one signal from the other to thereby provide an indication of the difference in propagation velocities of the two ultrasonic waves 23 as 33. Since the frequency of the output signals from the velocity meters 20 and 30 provide the desired information, any conventional mixer circuit may be used in conjunction with a filter to perform the step of subtracting.

Looking now to FIG. 2, the operation of the device will be explained. Curves 50 and 60 show the increase and decrease, respectively, of the velocity of the two ultrasonic waves 23 and 33 from the unstressed velocity $V_{o1}$ as the applied tensile stress is increased when the solid block is at temperature $T_1$. The difference between these divergent curves represents the output of the system and is directly proportional to the magnitude of the applied stress. Thus, for an applied stress having a value equal to $S_1$, the difference between the velocity of propagation of a perpendicularly polarized ultrasonic wave and a parallelly polarized wave is equal to $\Delta V_1$, as shown. Since the variation in velocity of the ultrasonic wave travelling through the material used in this example is inversely proportional to the temperature of the solid block for both modes of vibration, curves 50 and 60 will move up an equal amount to the position of dashed curves 51 and 61, respectively, and the unstressed velocity of propagation will move from point $V_{o1}$ to $V_{o2}$, when the ambient temperature drops from $T_1$ to $T_2$. However, since the ultimate output of the system is the difference between the perpendicular and parallel mode wave velocities, represented by curves 51 and 61 for temperature $T_2$, the output for an applied stress of $S_1$ will be $\Delta V_2$ which can be seen to be equal to $\Delta V_1$. Therefore, the output of the stress gauge becomes insensitive to temperature and provides an accurate indication of the magnitude of the applied stress.

It can be seen that the stress gauge is particularly well suited for use as an underwater pressure gauge. This is primarily due to the fact that there are no sensitive moving parts in the present invention which would necessitate delicate and complex mounting hardware to prevent shock and vibration from introducing errors. In addition, the gauge, being temperature self-compensating, provides accurate pressure information regardless of the surrounding water temperature.

The device is also easily adapted for measurement of the stress existing in steel beams located in inaccessible areas of large ships. The transducer elements may be mounted directly on the beams thereby enabling a constant and precise indication of the condition of the structure. These functions performed by the present invention are extremely important and, due to the low resolution and high degree of temperature error found in prior art devices, have not previously been practical.

In summary, there is shown and described a temperature insensitive stress gauge which has a high degree of resolution and low hysteresis, is shock and vibration resistant, and is readily adaptable to various oceanographic applications, for example, underwater pressure measurement systems.

It should be understood, of course, that the foregoing disclosure relates to only a preferred embodiment of the invention and that numerous modifications or alterations may be made therein without departing from the spirit and scope of the invention as set forth in the appended claims.

I claim:

1. Apparatus for measuring the stress applied to a solid wherein the velocity of propagation of any ultrasonic wave through said solid is similarly related to the temperature of said solid comprising:

means for transmitting a first polarized ultrasonic wave through said solid in a direction normal to the direction of applied stress with its polarization plane parallel to said direction of applied stress to thereby establish an inversely proportional relationship between its velocity of propagation and the magnitude of said applied stress;

means for simultaneously transmitting a second polarized ultrasonic wave through said solid in a direction normal to the direction of applied stress with its polarization plane perpendicular to said direction of applied stress to thereby establish a directly proportional relationship between its velocity of propagation and the magnitude of said applied stress; wherein each of said means for transmitting said first and second polarized ultrasonic wave comprises at least two transducer crystals, each having a preferred polarizing direction, mounted on opposing faces of said solid with their preferred polarizing directions parallelly aligned;

means for measuring the velocity of propagation of said first wave;

means for measuring the velocity of propagation of said second wave;

means for subtracting the velocity of propagation of one of said waves from the velocity of propagation of the other of said waves to thereby provide a signal representative of the magnitude of said applied stress independent of temperature variations of said solid; and means for displaying said signal.